US009646011B2

United States Patent
Yasue (10) Patent No.: US 9,646,011 B2
(45) Date of Patent: May 9, 2017

(54) DATE AND TIME FORMAT GENERATION METHOD, PROGRAM, AND SYSTEM FOR REFERENCE AND ELAPSED TIMESTAMPS TO PRODUCE A FORMATTED TARGET TIMESTAMP FOR USE IN STREAM PROCESSING

(71) Applicant: INTERNATIONAL BUSINESS MACHINES CORPORATION, Armonk, NY (US)

(72) Inventor: Toshiaki Yasue, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 416 days.

(21) Appl. No.: 14/019,080

(22) Filed: Sep. 5, 2013

(65) Prior Publication Data

US 2014/0068616 A1 Mar. 6, 2014

(30) Foreign Application Priority Data

Sep. 5, 2012 (JP) ................................. 2012-195544

(51) Int. Cl.
*G06F 9/46* (2006.01)
*G06F 17/30* (2006.01)

(52) U.S. Cl.
CPC .......... *G06F 17/30076* (2013.01); *G06F 9/46* (2013.01); *G06F 17/30569* (2013.01)

(58) Field of Classification Search
CPC . G06F 9/46; G06F 17/30076; G06F 17/30569
See application file for complete search history.

(56) References Cited

U.S. PATENT DOCUMENTS 6,643,664 B1 * 11/2003 Yaung ....................... G06F 8/70
                                                          707/809
6,853,957 B2 * 2/2005 Cagney ............. G06F 17/30569
                                                          341/122

(Continued)

FOREIGN PATENT DOCUMENTS

JP  07-152735 A  6/1995
JP  2002140238 A  5/2002

OTHER PUBLICATIONS

"Epoch Converter: Free Unix Timestamp and Epoch Conversion Tool", http://web.archive.org/web/20070514041930/http://www.epochconverter.com/, May 14, 2007.*

(Continued)

*Primary Examiner* — Benjamin Wu
*Assistant Examiner* — Michael Ayers
(74) *Attorney, Agent, or Firm* — Tutunjian & Bitetto, P.C.; David Quinn (57) ABSTRACT

Computing a date and time format includes obtaining a UT value of a reference time; computing intermediate data including year, month, day, hour, minute, and second, from the UT value of the reference time; computing a difference between a conversion target UT value and the UT value of the reference time using a processor; computing values of hour, minute, and second, based on the difference between the UT values; and generating a character string format representing year, month, day, hour, minute, and second, by combining the intermediate data and the values of hour, minute, and second.

11 Claims, 5 Drawing Sheets

(56) References Cited

U.S. PATENT DOCUMENTS

| | | | | |
|---|---|---|---|---|
| 8,417,981 B2* | 4/2013 | Luskind | ................... | G06F 1/12 |
| | | | | 713/400 |
| 2009/0077398 A1* | 3/2009 | Bland | .................... | G06F 1/329 |
| | | | | 713/320 |
| 2010/0083024 A1* | 4/2010 | Shibata | ..................... | G06F 1/14 |
| | | | | 713/400 |
| 2012/0254418 A1* | 10/2012 | Callaghan | ........... | H04L 41/0686 |
| | | | | 709/224 |
| 2012/0266010 A1* | 10/2012 | Kumar | ..................... | G06F 1/10 |
| | | | | 713/503 |
| 2014/0280200 A1* | 9/2014 | Dwan | .............. | G06F 17/30551 |
| | | | | 707/746 |

OTHER PUBLICATIONS

"ctime(3)-Linux man page", http://web.archive.org/web/20070714033631/http://linux.die.net/man/3/ctime Jul. 14, 2007.*
International Business Machines Corporation. "IBM Streams Processing Language Specification" IBM InfoSphere Streams. Copyrighted 2009. (88 Pages) Available at: pic.dhe.ibm.com/infocenter/streams/v2r0/topic/com.ibm.swg.im.infosphere.streams.product.doc/doc/IBMInfoSphereStreams-SPLLanguageSpecification.pdf.

* cited by examiner

DATE AND TIME FORMAT GENERATION METHOD, PROGRAM, AND SYSTEM FOR REFERENCE AND ELAPSED TIMESTAMPS TO PRODUCE A FORMATTED TARGET TIMESTAMP FOR USE IN STREAM PROCESSING

BACKGROUND

Technical Field

The present invention relates to a computer system, and more specifically relates to generation of a date and time format in a computer system.

Description of the Related Art

Recent years have seen increasing use of stream processing which is a data processing technique of processing, in real time, sequentially arriving data in time order (stream data). In addition to real time processing, stream processing is expected to be applied to a high-speed data-transformation process for large amounts of data, which is a process conventionally treated as ETL (Extract/Transform/Load). In this case, a processing speed on a per-core basis is particularly an important index. As a software platform for performing stream processing, for example, IBM® InfoSphere® Streams is available, and SPL (IBM® Streams Processing Language) is available on IBM® InfoSphere® Streams.

In stream processing, each processed data is sent by a chunk of data, which is called tuple in SPL, and date and time format conversion for the data on tuples is a frequently used conversion process. A converted date and time format is typically generated using a standard function based on UNIX® Time (hereafter referred to as UT). In the case where processing at a per-second rate on a per-core basis exceeding 10,000 tuples is required, however, the processing speed of existing standard functions causes a decrease in performance.

Data representing a date and time is very important data in business logic. Therefore, it is much more desirable to generate a date and time format using a standard function, than to simply implement a custom function and generate a date and time format using the custom function.

Known examples of such a standard function include the gmtime( ) and ctime( ) functions in Linux® and the time( ) function in SPL. The time function in SPL is convenient in that timezone can be designated as an argument. Generating a date and time format from a UT value using such functions is not very lightweight because leap years need to be taken into account. The process becomes heavier when timezone is taken into account. Calling such a standard function very frequently in stream processing causes a significant processing cost, which leads to a decrease in processing speed.

This raises demand to make a date and time format generation process more lightweight while using a standard function. The techniques described in the following Japanese Unexamined Patent Publications are known as conventional techniques relating to date and time format generation.

Japanese Unexamined Patent Publication No. H7-152735 discloses a time data processor including: storage means for storing logical time data composed of fields including a date, a time, an attribute, and a character string; input means for inputting time data of a character string as logical time data; time evaluation means for evaluating the logical time data and executing an operation for the time data; and display control means for outputting and displaying the logical time data in a predetermined expression format based on format information.

Japanese Unexamined Patent Publication No. 2002-140238 discloses the following technique. A client PC is connected to a server via a communication line and references to data in a database. At this point, the client PC obtains the server time by executing a function of a form by a web browser, obtains its own local time by JavaScript, and determines their time difference. Time data is corrected based on the determined difference.

However, the above-mentioned conventional techniques fail to suggest a technique for making a date and time format generation process more lightweight.

SUMMARY

Accordingly, it is an object of the present invention to provide a technique applicable to stream processing for making a date and time format generation process more lightweight.

The present invention speeds up conversion from UT to a date and time character string based on the fact that, in many cases, times included in records, or tuples in SPL, to be processed in stream processing or ETL processing are close to each other.

That is, a system according to the present invention once executes a standard function, e.g., the time function, on a UT value of a reference time, for date specification which is a key issue in date and time conversion. The system holds values of year, month, day, hour, minute, and second obtained as a result, in a predetermined time structure or the like as intermediate data. Subsequently, the system computes an actual time from a difference in UT.

A process according to the present invention includes an initialization process and an execution process.

The initialization process is a process of obtaining the UT value of the reference time as an initial value and computing the following difference conversion data:

the UT value of the reference time;

the intermediate data (i.e. tm structure value) as a result of computing year, month, day, hour, minute, and second from the UT value of the reference time; and a valid range (lower limit and upper limit of UT) of the reference time.

The execution process is a process of, in the case where there is difference conversion data having a valid range that corresponds to UT data to be converted (conversion target UT value), performing a conversion process using the difference conversion data through the following procedure. In more detail, the following process is performed:

compute hour, minute, and second corresponding to the conversion target UT value, from a difference between the conversion target UT value and the UT value of the reference time;

generate converted values of year, month, day, hour, minute, and second, from the year, month, and day of the intermediate data and the hour, minute, and second computed in the foregoing step; and convert the converted values of year, month, day, hour, minute, and second, to a character string format.

In the execution process, a difference conversion data update process is further performed as follows:

obtain a new reference time, generate difference conversion data, and add the difference conversion data in the case where a predetermined condition is met, the process being substantially the same as the initialization process mentioned above; and delete existing difference conversion data in the case where a predetermined condition is met.

According to the present invention, a standard function such as the time function is once executed on a UT value of a reference time for date specification which is a key issue in date conversion, and subsequently an actual time is computed from a difference value of each individual UT value. A more lightweight date conversion process can thus be realized. That is, since the process of computing hour, minute, and second from a difference value is lightweight, the date conversion process can be speeded up by reducing the number of times the time function is called and using the subsequent process of computing hour, minute, and second from a difference value.

Moreover, the same year, month, and day can be used by setting such a UT value that enables difference computation. The year, month, and day are obtained by the standard time function, and so are highly reliable in accuracy.

Furthermore, by adding, deleting, or changing a UT value, intermediate data, and a valid range related to a reference time in accordance with execution status, it is possible to support continuous processing.

DETAILED DESCRIPTION OF PREFERRED EMBODIMENTS

The following describes an embodiment of the present invention with reference to drawings. Note that the following merely describes a preferred embodiment of the present invention, and the scope of the present invention should not be limited to the embodiment described here. The same reference numerals designate the same elements throughout the drawings, unless otherwise stated.

Figure 1:
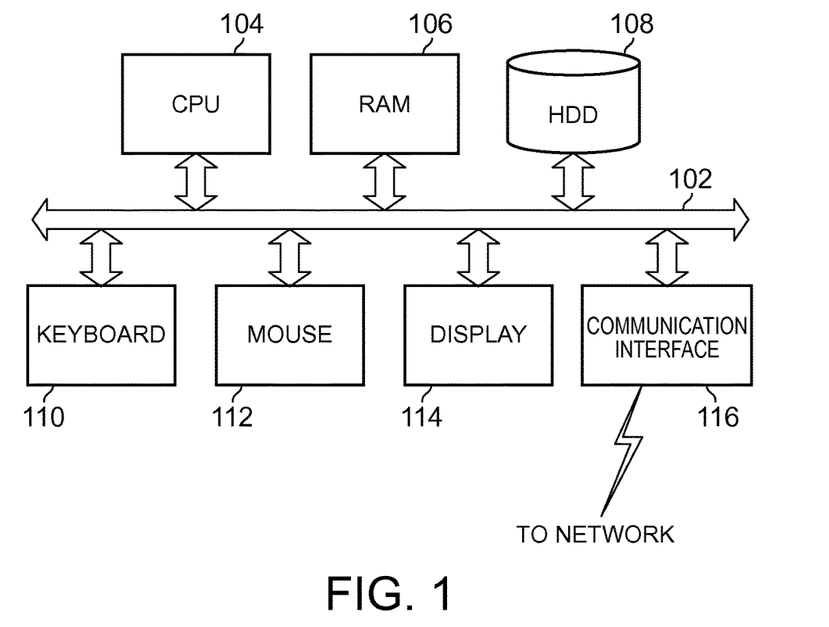
FIG. 1 is a block diagram of hardware for implementing the present invention.

FIG. 1 is a block diagram of computer hardware for realizing a system structure and process according to an embodiment of the present invention. In FIG. 1, a CPU 104, a main memory (RAM) 106, a hard disk drive (HDD) 108, a keyboard 110, a mouse 112, and a display 114 are connected to a system bus 102.

The computer hardware usable for the present invention is IBM® System X3850, though not limited to such. In the system, the CPU 104 is Xeon® by Intel Corporation, the main memory 106 preferably has a capacity of 16 GB, and the hard disk drive 108 preferably has a capacity of 4 TB.

The hard disk drive 108 is installed with an operating system. The operating system is preferably Linux™, though other operating systems that support UNIX Time (UT) are also applicable.

The hard disk drive 108 is also installed with IBM® InfoSphere® Streams, on which SPL (IBM Streams Processing Language) is available.

The hard disk drive 108 further stores a time computation program according to the present invention written in SPL. The time computation program will be described later, with reference to FIG. 2 and the like.

The keyboard 110 and the mouse 112 are used to write a stream processing program using SPL.

The display 114 is preferably an LCD monitor of 32-bit true color having a resolution of 1024×768 or more, though not limited to such. The display 114 is used to display source code of the stream processing program and display progress of stream processing.

A communication interface 116 is preferably connected to a network by an Ethernet protocol.

Figure 2:
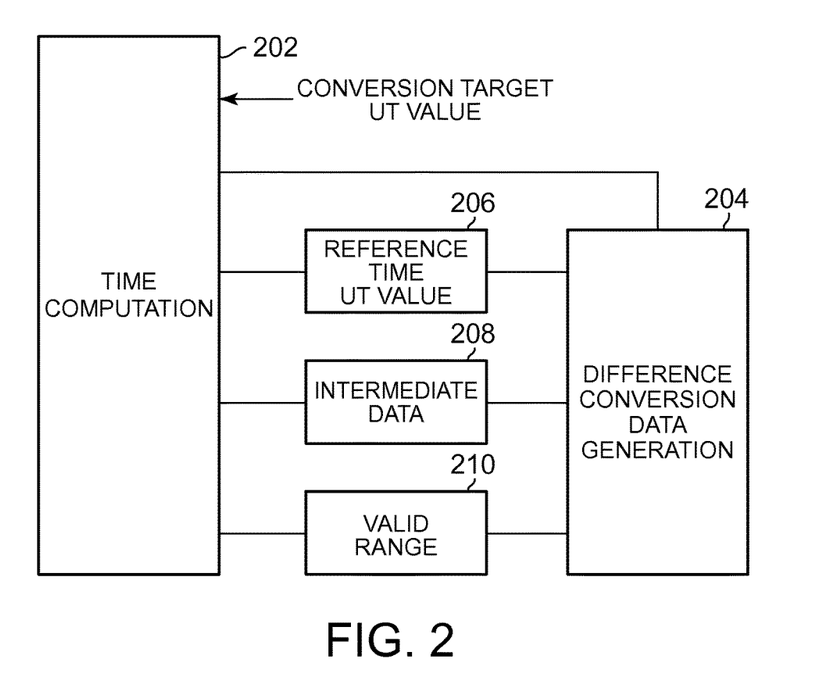
FIG. 2 is a block diagram of functions for generating a date and time format according to the present invention.

FIG. 2 is a block diagram of the time computation program according to the present invention which is stored in the hard disk drive 108 and operates in conjunction with stream processing. The time computation program has a function of receiving a conversion target UT value and generating a corresponding date and time string. Though the time computation program is written in SPL in this embodiment as mentioned earlier, the present invention is not limited to this, and the time computation program may be generated in any programming language such as C, C++, C#, Java®, or the like.

As shown in FIG. 2, the time computation program includes: a time computation routine 202 as a main routine for receiving the conversion target UT value; and a difference conversion data generation routine 204 called from the time computation routine 202.

The process of the time computation routine 202 will be described later, with reference to a flowchart in FIG. 3.

Figure 4:
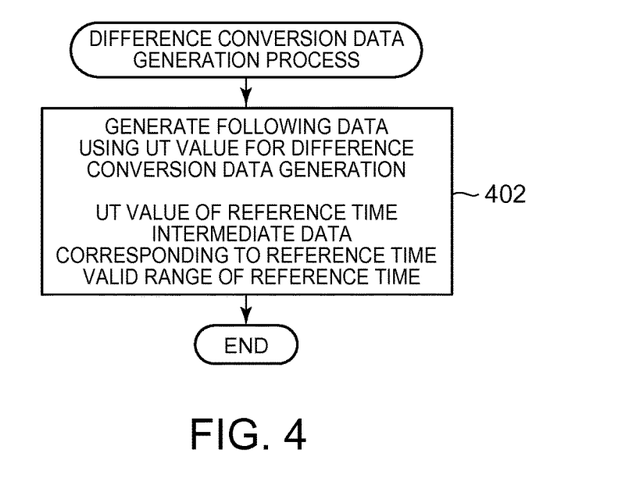
FIG. 4 is a flowchart of a difference conversion data generation process.

The difference conversion data generation routine 204 calls the time function to obtain a UT value as an initial value for data generation, in step 402 in the flowchart of FIG. 4. Here, a UT value included in initially arriving data, a current time, or the like may be used as the UT value as the initial value for data generation.

Intermediate data as an initial value for data generation is typically a tm structure, defined as having the following data structure, where a value is stored in each variable when the standard time function is called.

```
int tm_sec; // seconds [0 to 61] (including at most two leap seconds)
int tm_min; // minutes [0 to 59]
int tm_hour; // hours [0 to 23]
int tm_mday; // day of month [1 to 31]
int tm_mon; // month [0 to 11] (month number − 1)
int tm_year; // years (since 1900)
int tm_wday; // day of week [0 to 6]
(Sunday: 0, Monday: 1, Tuesday: 2, Wednesday: 3, Thursday: 4, Friday: 5, Saturday: 6)
int tm_yday; // days since January 1 [0 to 365]
int tm_isdst; // whether or not summer time is in effect (0: not in effect, positive value: in effect)
```

From the above-mentioned intermediate data and UT value as the initial values for data generation, difference seconds at 00:00 of the date are obtained, and the following data are computed as difference conversion data.

(1) A UT value of a reference time: a UT value at 00:00 of the date.

(2) Intermediate data corresponding to the reference time: a tm structure value at 00:00 of the date.

(3) A valid range of the reference time: a lower limit=the UT value at 00:00 of the date, an upper limit=(the lower limit)+24*3600 seconds.

As shown in FIG. 2, the difference conversion data generation routine 204 stores these three values, namely, a reference time UT value 206, intermediate data 208, and a valid range 210, in positions of predetermined addresses in the RAM 106 as an example, to enable the time computation routine 202 to reference to these values.

Figure 3:
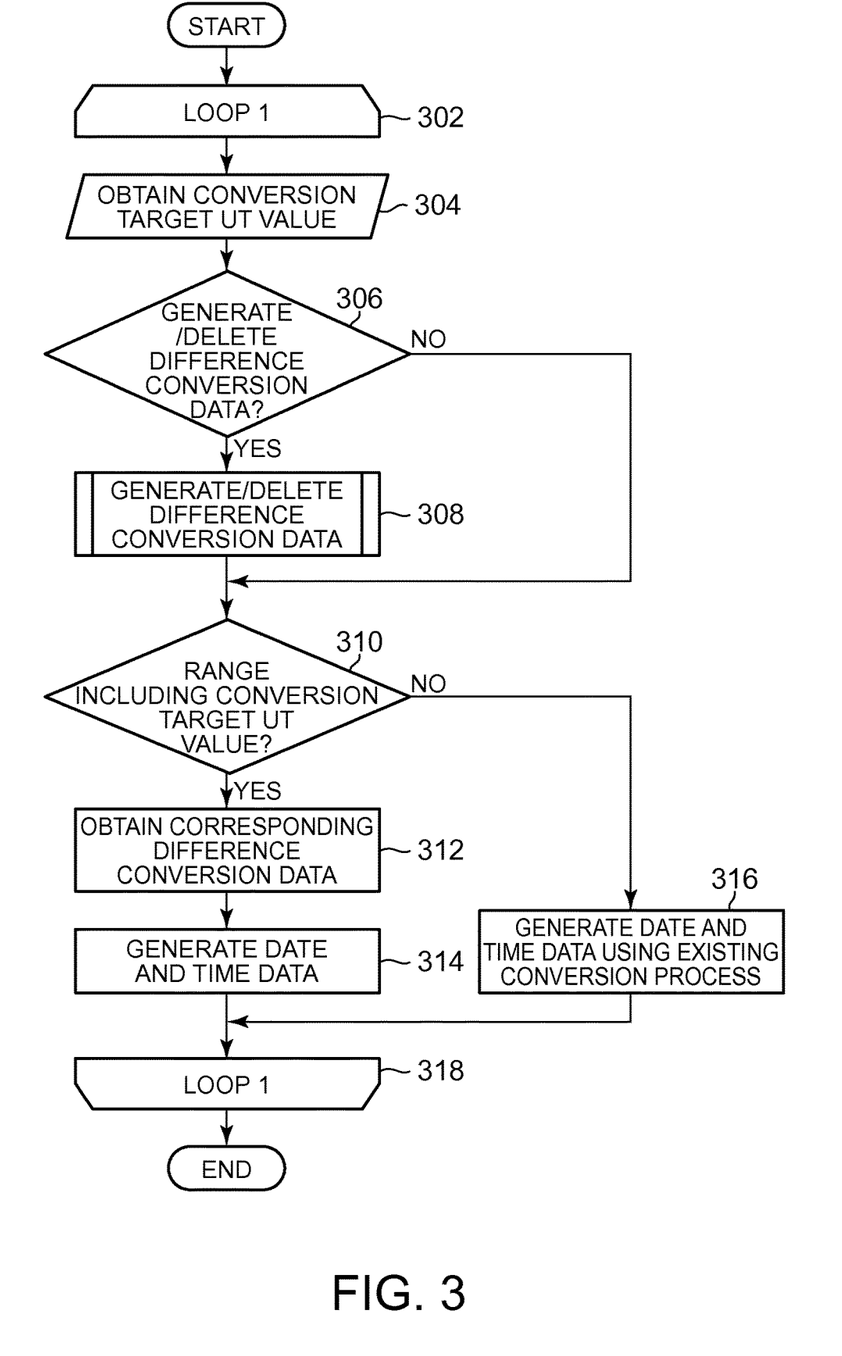
FIG. 3 is a flowchart of a time computation routine according to the present invention.

The following describes the process of the time computation routine 202, with reference to the flowchart in FIG. 3. This process is an infinite loop from step 302 to step 318, as shown in the drawing. In the loop, the time computation routine 202 obtains a conversion target UT value for generating a date and time format for a process of converting sequentially arriving data, in step 304.

The time computation routine 202 determines whether or not to generate/delete difference conversion data, in step 306. This determination is basically made using an evaluation function to which previously arriving data and newly arriving data are input. An example of the evaluation function is given below.

a. In the case where a specific value is set in sequentially flowing data.

b. A re-initialization flag is set when special data called Punctuation arrives, and the flag is determined in step 306.

c. In the case where the conversion target UT value does not correspond to a range of any existing "difference conversion data" and also new "difference conversion data" is determined as necessary according to some kind of evaluation function including past non-corresponding data. This evaluation function may be implemented as follows.

c-1. In the case where, when comparing a distribution of most recent UT values corresponding to a range of difference conversion data, the distribution is within the last 10% of the range of the difference conversion data and it would be expected that the UT value of the incoming data in the nearest future will not correspond to the range soon (to deal with a situation where the target UT value changes continuously).

c-2. In the case where, when recording UT values not corresponding to a valid range of difference conversion data, the number of UT values reaches a predetermined number (to deal with a situation where a plurality of different streams are merged).

d. In the case where existing "difference conversion data" is not used at all for conversion for a specified time period.

In the case where the determination results in yes, a process of generating or deleting conversion data is performed in step 308. This process is in accordance with the determination process in step 306. An example of the process corresponding to the example of a, b, c-1, c-2, and d is given below.

a. Generate difference conversion data using a time included in the data.

b. Generate difference conversion data using a time included in data arriving next.

c-1. Generate and add difference conversion data for a next day.

c-2. Generate and add difference conversion data that covers these data, by calling the difference conversion data generation routine 204.

d. Delete the unused difference conversion data.

The following implementation is also possible: a maximum number of sets of difference conversion data is specified and, in the case where the maximum number is exceeded when new difference conversion data is generated, sets of difference conversion data are deleted in increasing order of most recent use frequency until the maximum number is reached.

After the process in step 308 or in the case where the determination in step 306 results in no, the time computation routine 202 determines whether or not there is a range including the conversion target UT value, in step 310. In detail, this determination is made by determining whether or not the condition "lower limit≤conversion target UT value≤upper limit" is met. The lower limit and the upper limit are obtained from the valid range 210. If the condition is met, the time computation routine 202 computes difference values of hour, minute, and second between the conversion target UT value and the reference time UT value 206 in step 312, as follows.

```
// the reference time UT is assumed to be the UT value at 00:00:00
of the date.
    tmp1 = (conversion target UT value) − (reference time UT value) //
(number of seconds since 00:00:00)
    (hour) = tmp1 / 3600;
    tmp2 = tmp1 − (hour) * 3600;
    (minute) = tmp / 60;
    (second) = tmp − (minute) * 60;
```

The time computation routine 202 adds the values of hour, minute, and second computed in this way to the data obtained from the intermediate data 208, thereby generating date and time data (date and time format) in step 314. When doing so, a function equivalent to sprintf( ) in C language may preferably be used.

In the case of determining in step 310 that the condition "lower limit≤conversion target UT value≤upper limit" is not met, the time computation routine 202 generates date and time data using an existing conversion process of calling the standard time function, in step 316.

The embodiment described above does not take summer time into account. An embodiment that takes summer time into account is described next. In the embodiment that takes summer time into account, the difference conversion data generation routine shown in FIG. 4 is replaced with a difference conversion data generation routine shown in FIG. 5. Meanwhile, the same time computation routine 202 as in FIG. 3 can be used in this case, too.

Figure 5:
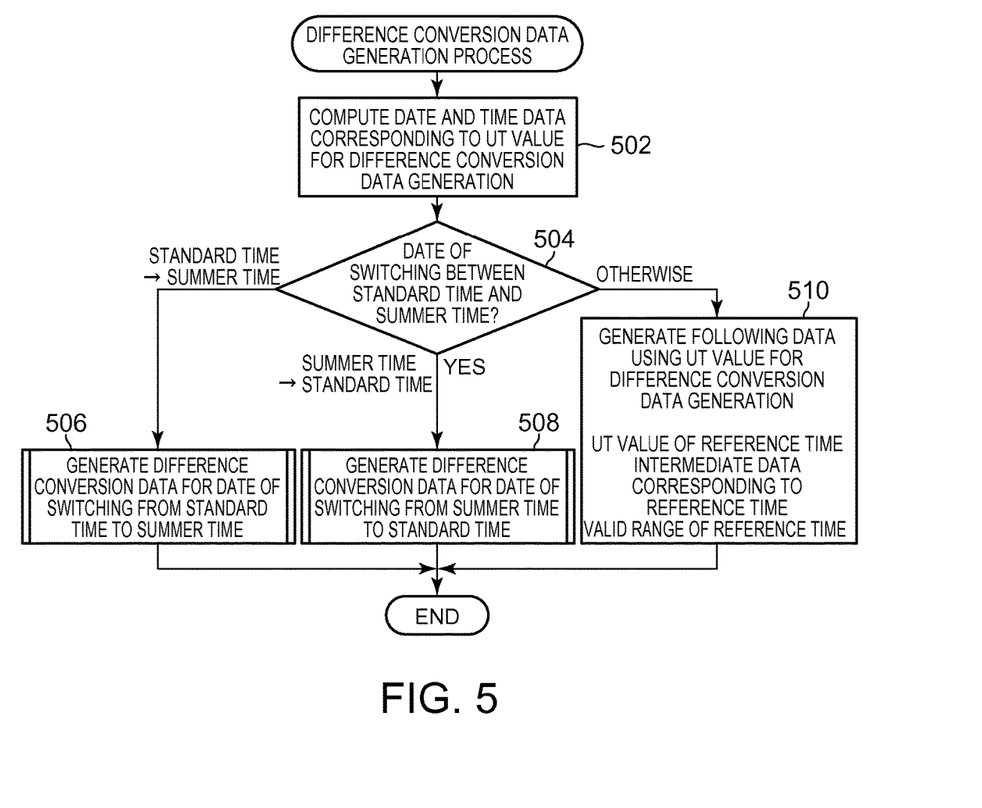
FIG. 5 is a flowchart of a summer time difference conversion data generation process.

In a flowchart in FIG. 5, the summer time difference conversion data generation routine calls the standard time function and computes date and time data corresponding to a UT value for difference conversion data generation, in step 502.

The summer time difference conversion data generation routine determines, using the date and time data computed in step 502, whether or not the date is a date of switching between standard time and summer time, in step 504. Each date and time determined here is as follows.

Standard time→summer time (02:00 a.m. on the second Sunday in March): the day includes no 02:00 to 03:00, and has 23 hours (03:00:00 following 01:59:59).

Summer time→standard time (02:00 a.m. on the first Sunday in November): the day includes 01:00 to 02:00 twice, and has 25 hours (01:00:00 following 01:59:59).

Figure 6:
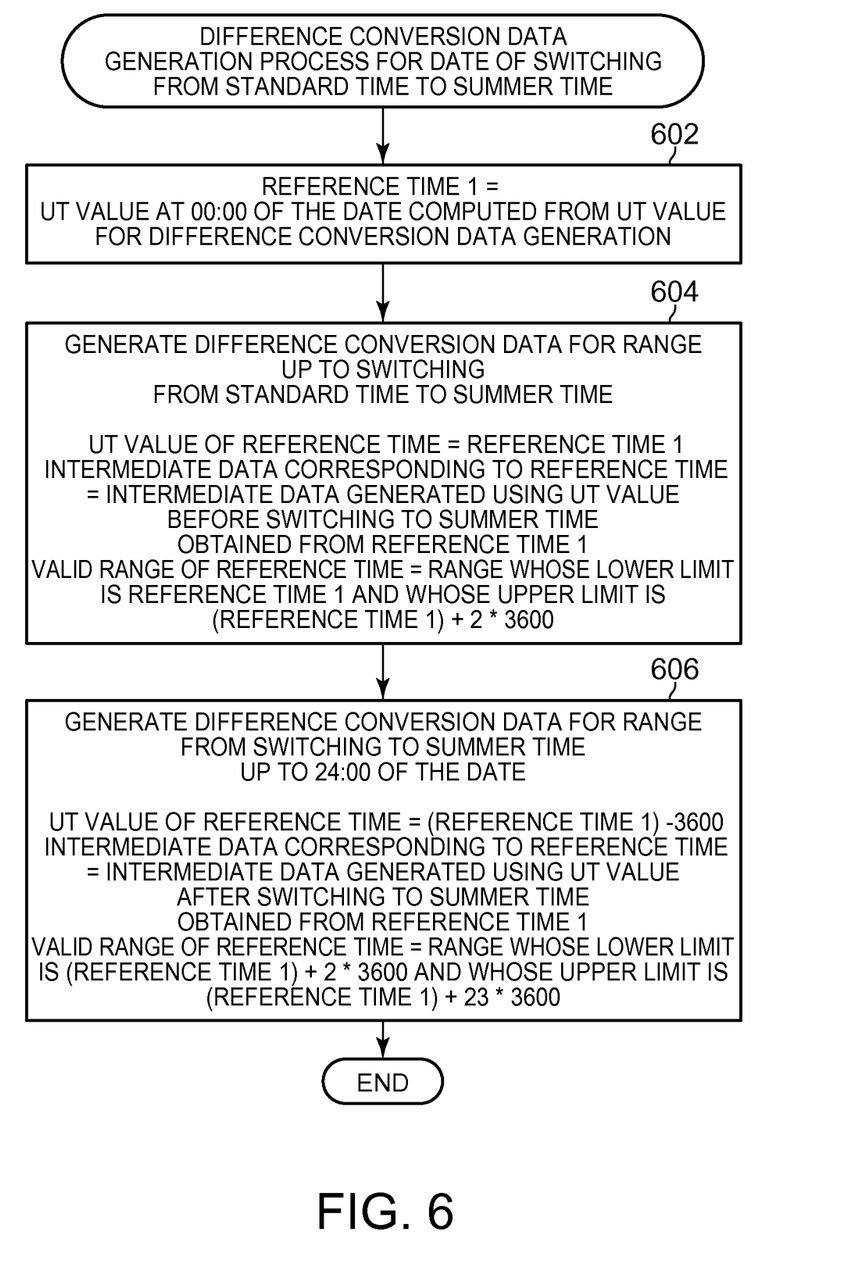
FIG. 6 is a flowchart of the summer time difference conversion data generation process.

In the case of switching "standard time→summer time", the summer time difference conversion data generation routine executes a process of a flowchart shown in FIG. 6, in step 506.

In detail, in FIG. 6, the summer time difference conversion data generation routine executes a process of setting "reference time 1=UT value at 00:00 of the date computed from UT value for difference conversion data generation", in step 602.

The summer time difference conversion data generation routine then performs the following computation to generate difference conversion data for a range up to switching from standard time to summer time, in step 604:

UT value of reference time=reference time 1;

intermediate data corresponding to reference time=intermediate data generated using UT value before switching to summer time obtained from reference time 1; and valid range of reference time=range whose lower limit is reference time 1 and whose upper limit is (reference time 1)+2*3600.

Next, the summer time difference conversion data generation routine performs the following computation to generate difference conversion data for a range from switching to summer time up to 24:00 of the date, in step 606:

UT value of reference time=(reference time 1)−3600;

intermediate data corresponding to reference time=intermediate data generated using UT value after switching to summer time obtained from reference time 1; and valid range of reference time=range whose lower limit is (reference time 1)+2*3600 and whose upper limit is (reference time 1)+23*3600.

Figure 7:
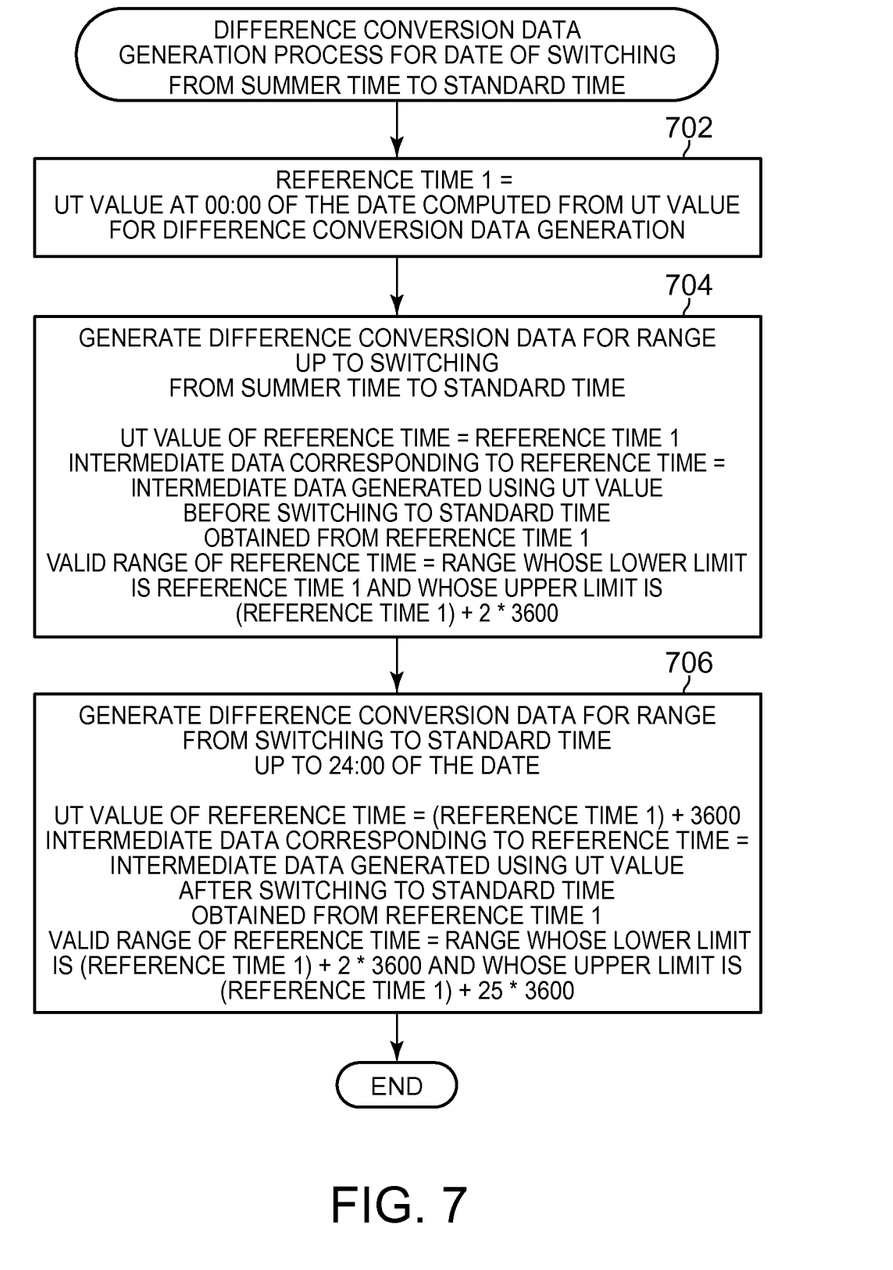
FIG. 7 is a flowchart of the summer time difference conversion data generation process.

In the case of switching "summer time→standard time", the summer time difference conversion data generation routine executes a process of a flowchart shown in FIG. 7, in step 508.

In detail, in FIG. 7, the summer time difference conversion data generation routine executes a process of setting "reference time 1=UT value at 00:00 of the date computed from UT value for difference conversion data generation", in step 702.

The summer time difference conversion data generation routine then performs the following computation to generate difference conversion data for a range up to switching from summer time to standard time, in step 704:

UT value of reference time=reference time 1;

intermediate data corresponding to reference time=intermediate data generated using UT value before switching to standard time obtained from reference time 1; and valid range of reference time=range whose lower limit is reference time 1 and whose upper limit is (reference time 1)+2*3600.

Next, the summer time difference conversion data generation routine performs the following computation to generate difference conversion data for a range from switching to standard time up to 24:00 of the date, in step 706:

UT value of reference time=(reference time 1)+3600;

intermediate data corresponding to reference time=intermediate data generated using UT value after switching to standard time obtained from reference time 1; and valid range of reference time=range whose lower limit is (reference time 1)+2*3600 and whose upper limit is (reference time 1)+25*3600.

Referring back to the flowchart in FIG. 5, in the case of neither switching "standard time→summer time" nor switching "summer time→standard time", the summer time difference conversion data generation routine performs the same process as in step 402 in FIG. 4, in step 510.

The following shows code of an implementation example of generating a date and time format using the time function in SPL according to a conventional technique:

```
Ctype InputFile_T = int64 timeUT; // Unix Time
type InternalData_T = rstring stringTime; // YYYYMMDDhhmmss
composite UtStrConverterTimeC (output Out; input In) {
    graph
        stream <InternalData_T> Out as Output = Functor(In as Input) {
            logic
                state : {
                    mutable Sys.tm stm = {sec=0,min=0,hour=0,mday=0,mon=0,year=0,wday=0,yday=0,isdst=0,gmtoff=0,zone=""};
                    mutable rstring timeStr;
                }
                onTuple Input: {
//mmmmmmmmmmmmmmmmmmmmmmmmmmmmmmmmmmmmmmmmmmmm
// Start time format conversion
//mmmmmmmmmmmmmmmmmmmmmmmmmmmmmmmmmmmmmmmmmmmm
                    timestamp ts = createTimestamp(Input.timeUT, 0u);
                    time(ts, "JST", stm);
                    timeStr = strftime(stm, "%Y%m%d%H%M%S");
                }
                output Output:
                    stringTime = timeStr;
        }
}
```

The following shows code of an implementation example of generating a date and time format by SPL according to the present invention:

```
    type InputFile_T = int64 timeUT; // Unix Time
    type InternalData_T = rstring stringTime; // YYYYMMDDhhmmss
    int64 getNanosecondFrom000000(Sys.tm stm) {
        return (int64)(stm.hour * 3600 + stm.min * 60 + stm.sec) * 10000000001;
    }
    composite UtStrConverterOptT1 (output Out; input In) {
        graph
            stream <InternalData_T> Out as Output = Functor(In as Input) {
                logic
                    state : {
                        mutable Sys.tm stm =
    {sec=0,min=0,hour=0,mday=0,mon=0,year=0,wday=0,yday=0,isdst=0,gmtoff=0,zone=
""};
                        mutable rstring timeStr;
                        mutable boolean isInitialized = false;
                        mutable timestamp currentTimestamp, ts000000, ts240000;
                    }
                    onPunct Input: {
                        isInitialized = false; // re-compute difference computation data each time
Punctuation is received
                    }
                    onTuple Input: {
                        if (!isInitialized) {
                            currentTimestamp = createTimestamp(Input.timeUT, 0u);
                            time(currentTimestamp, "UTC", stm);
                            int64 diff = getNanosecondFrom000000(stm);
                            ts000000 = add(currentTimestamp, (-diff));
                            ts240000 = add(ts000000, (241*36001*10000000001));
                            stm.sec = 0; stm.min = 0; stm.hour = 0;
                            isInitialized = true;
                        }
    // mmmmmmmmmmmmmmmmmmmmmmmmmmmmmmmmmmmmmmmmmmmmm
    // Start time format conversion
    // mmmmmmmmmmmmmmmmmmmmmmmmmmmmmmmmmmmmmmmmmmmmm
                        timestamp ts = createTimestamp(Input.timeUT, 0u);
                        if (ts000000 <= ts && ts < ts240000) {
                            int32 sec = (int32)(diffAsNanos(ts, ts000000) / 10000000001);
                            stm.hour = sec / 3600;
                            int32 sec2 = sec - stm.hour * 3600;
                            stm.min = sec2 / 60;
                            stm.sec = sec2 - stm.min * 60;
                            timeStr = strftime(stm, "%Y%m%d%H%M%S"); // this character
sting processing may also be implemented by sprintf( ) in C++ using Native Function
                        } else {
                            mutable Sys.tm stmCurr =
{sec=0,min=0,hour=0,mday=0,mon=0,year=0,wday=0,yday=0,isdst=0,gmtoff=0,zone=""};
                            time(ts, "JST", stmCurr);
                            timeStr = strftime(stmCurr, "%Y%m%d%H%M%S");
                        }
                    }
                    output Output :
                        stringTime = timeStr;
            }
    }
```

Though the above describes the embodiment of implementing the present invention by SPL (Stream Processing Language) on IBM® InfoSphere® Streams, it should be understood that the present invention may be realized by a program written in any programming language on any operating system capable of using UNIX Time.

Though the tm structure is used as the intermediate data in the embodiment described above, this is merely one example, and any data structure available to a person skilled in the art may be used as the intermediate data.

Moreover, the timing of newly obtaining the UT value of the reference time is not limited to the date change, and may be set to any timing such as at hourly intervals.

What is claimed is:

1. A method for performing stream processing, comprising:
   executing a stream processing program on a computer system that receives a chunk of data that includes a conversion target UNIX Time (UT) value;
   obtaining a UT value of a reference time from the stream processing program;
   computing intermediate data, comprising a year, month, day, hour, minute, and second corresponding to the UT value of the reference time;
   computing a difference between the conversion target UT value and the UT value of the reference time using a processor;
   computing values for an hour, minute, and second corresponding to a size of the difference between the UT values;

generating a character string representing a year, month, day, hour, minute, and second corresponding to the conversion target UT value, by combining the intermediate data and the values of the hour, minute, and second corresponding to the size of the difference between UT values after computing the intermediate data and the values of the hour, minute, and second corresponding to the size of the difference between UT values;

storing the character string as a timestamp of the chunk of data;

periodically obtaining a new UT value of a new reference time; and re-computing intermediate data including year, month, day, hour, minute, and second, from the new UT value of the new reference time.

2. The method according to claim 1, wherein periodically obtaining a new UT value is triggered by a change of date.

3. The method according to claim 1, wherein the intermediate data has a data structure of a tm structure.

4. The method according to claim 2, wherein a UT value at 00:00 of a current date is obtained as the UT value of the reference time.

5. The method according to claim 4, wherein a valid range of the reference time is set to have a lower limit that is the UT value at 00:00 of the date and an upper limit that is (lower limit)+24*3600 seconds, and wherein the new UT value is obtained when the conversion target UT value is not between the lower limit and the upper limit.

6. The method according to claim 2, further comprising computing and storing intermediate data and a valid range for a next day, in response to the current time being a predetermined value.

7. The method according to claim 1, wherein computing values for an hour, minute, and second corresponding to a size of the difference between the UT values is performed on a day other than a day that changes between standard time and summer time.

8. The method according to claim 7, further comprising, on a day that changes between standard time and summer time, computing values for an hour, minute, and second corresponding to a size of the difference between the UT values for a transitional time range and computing values for an hour, minute, and second corresponding to a size of the difference between the UT values offset by one hour after expiration of the transitional time range.

9. The method according to claim 8, wherein the transitional time range is two hours.

10. The method according to claim 8, wherein on a day that changes from standard time to summer time, computing values for an hour, minute, and second corresponding to a size of the difference between the UT values that are offset by one hour continues for a time range of twenty-three hours.

11. The method according to claim 8, wherein on a day that changes from summer time to standard time, computing values for an hour, minute, and second corresponding to a size of the difference between the UT values that are offset by one hour continues for a time range of twenty-five hours.

* * * * *